United States Patent
Nuggehalli et al.

(10) Patent No.: US 12,532,213 B2
(45) Date of Patent: Jan. 20, 2026

(54) COMMUNICATION COORDINATION AND REDUCED PROCESSING TECHNIQUES FOR ENHANCED QUALITY OF SERVICE PROCEDURES

(71) Applicant: Apple Inc., Cupertino, CA (US)

(72) Inventors: Pavan Nuggehalli, San Carlos, CA (US); Fangli Xu, Beijing (CN); Haijing Hu, Los Gatos, CA (US); Ralf Rossbach, Munich (DE); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 851 days.

(21) Appl. No.: 17/785,387

(22) PCT Filed: Sep. 2, 2021

(86) PCT No.: PCT/CN2021/116196
§ 371 (c)(1),
(2) Date: Mar. 9, 2023

(87) PCT Pub. No.: WO2023/028940
PCT Pub. Date: Mar. 9, 2023

(65) Prior Publication Data
US 2023/0337045 A1 Oct. 19, 2023

(51) Int. Cl.
*H04W 28/02* (2009.01)
*H04W 28/24* (2009.01)

(52) U.S. Cl.
CPC ... *H04W 28/0268* (2013.01); *H04W 28/0273* (2013.01); *H04W 28/24* (2013.01)

(58) Field of Classification Search
CPC ............. H04W 28/24; H04W 28/0268; H04W 28/0273; H04W 28/0252
See application file for complete search history.

(56) References Cited

U.S. PATENT DOCUMENTS

2014/0254481 A1* 9/2014 Lee ................. H04M 15/82
370/328
2019/0029057 A1 1/2019 Pan et al.
(Continued)

FOREIGN PATENT DOCUMENTS

| CN | 109155933 A | 1/2019 |
| EP | 3665973 | 6/2020 |

(Continued)

OTHER PUBLICATIONS

Office Action for EP Patent Application No. 21899316.0; Nov. 6, 2024.
(Continued)

*Primary Examiner* — Huy D Vu
*Assistant Examiner* — Bao G Nguyen
(74) *Attorney, Agent, or Firm* — Kowert, Hood, Munyon, Rankin & Goetzel, P.C.

(57) ABSTRACT

A base station (BS) may receive, from a network node, one or more data packets including one or more reflective quality of service (QoS) indicator (RQI) markings. The base station may then determine, based on a value of the one or more RQI markings, one or more active uplink (UL) QoS rules associated with a user equipment (UE). The base station may further determine, based on at least one of one or more timers, the one or more active UL QoS rules, and status information received from the UE, to include or refrain from including the one or more RQI markings in a transmission of the one or more data packets to the UE. Accordingly, in response to the determining that the RQI markings should be included, the base station may then transmit the one or more packets including the RQI markings to the UE.

20 Claims, 5 Drawing Sheets

(56) References Cited

U.S. PATENT DOCUMENTS

| | | | |
|---|---|---|---|
| 2020/0052831 A1* | 2/2020 | Yang | H04L 1/1812 |
| 2020/0154304 A1 | 5/2020 | Cho et al. | |
| 2020/0178112 A1* | 6/2020 | Youn | H04W 28/0268 |
| 2022/0304099 A1* | 9/2022 | Kim | H04W 76/32 |
| 2023/0344600 A1* | 10/2023 | Levitsky | H04L 1/0026 |

FOREIGN PATENT DOCUMENTS

| | | |
|---|---|---|
| EP | 3665973 A1 | 6/2020 |
| JP | 2020519173 | 6/2020 |
| WO | 2019101331 | 5/2019 |

OTHER PUBLICATIONS

LG Electronics Inc. "Issues on QoS in NG-RAN"; 3GPP TSG-RAN WG3 Meeting #95bis; R3-170955, Apr. 3, 2017.

Office Action for JP No. 2024-513151; Dec. 24, 2024.
Samsung "Deactivating QoS Rule derived by Reflective QoS via User Plane", 3GPP TSG SA WG2 #121 S2-173187, May 6, 2017.
MediaTek "KI#2—MediaTek views on QoS Framework (email discussion)", 3GPP TSG-SA WG2#116 S2-163407, Jul. 5, 2016.
Samsung "On the logical mismatch in setting of the AS and NAS reflective QoS indicator", 3GPP TSG RAN WG2 #101bis R2-1804339, Apr. 6, 2018.
International Search Report and Written Opinion for PCT/CN2021/116196; 9 pages; May 25, 2022.
Xiaomi "Details of one byte SDAP Header Format"; 3GPP TSG-RAN2 NR AH-1801 R2-1800233; Vancouver, Canada; 4 pages; Jan. 26, 2018.
Extended European Search Report for EP Patent Application No. 21899316.0; 8 pages; Oct. 24, 2022.

* cited by examiner

COMMUNICATION COORDINATION AND REDUCED PROCESSING TECHNIQUES FOR ENHANCED QUALITY OF SERVICE PROCEDURES

PRIORITY CLAIM

This application is a national phase entry of PCT application number PCT/CN2021/116196, entitled "Communication Coordination and Reduced Processing Techniques for Enhanced Quality of Service Procedures," filed Sep. 2, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatuses, systems, and methods for communication coordination and reduced processing techniques for enhanced quality of service procedures for wireless communication systems.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The increasing number of features and functionality introduced in wireless communication devices also creates a continuous need for improvement in both wireless communications and in wireless communication devices. In particular, it is important to ensure the accuracy of transmitted and received signals through user equipment devices (UEs), e.g., through wireless devices such as cellular phones, base stations and relay stations used in wireless cellular communications. In addition, increasing the functionality of a UE device can place a significant strain on the battery life and processing or computing capabilities of the UE device. Thus, it is very important to also reduce power and processing or computing requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for coordinating communication and providing reduced processing techniques for enhanced quality of service procedures for wireless communication systems.

In some embodiments, a base station (BS) may receive, from a network node, one or more data packets including one or more reflective quality of service (QoS) indicator (RQI) markings. The base station may determine, based on a value of the one or more RQI markings, one or more active uplink (UL) QoS rules associated with a user equipment (UE). Additionally or alternatively, the base station may further determine, based on at least one of one or more timers, the one or more active UL QoS rules, and status information received from the UE, to include or refrain from including the one or more RQI markings in a transmission of the one or more data packets to the UE. The base station may transmit, in response to determining that the one or more RQI markings should be included, the one or more data packets to the UE, wherein the one or more packets comprise the one or more RQI markings.

Additionally or alternatively, the base station may determine, based on at least one of one or more timers, the one or more active UL QoS rules, and status information received from the UE, to refrain from including the one or more RQI markings in a transmission of the one or more data packets to the UE. Accordingly, the base station may transmit, in response determining to refrain from including the one or more RQI markings in the transmission, the one or more packets to the UE, wherein the one or more packets do not comprise the one or more RQI markings.

According to some embodiments, the base station may be further configured to initiate and maintain a timer corresponding to a protocol data unit (PDU) session at the UE. Moreover, the base station may determine, based on the timer, that the UE may discard the current QoS rule based on an additional timer initiated and maintained by the UE. Accordingly, the base station may transmit, in response to the determination that the UE will discard the current QoS rule, a message indicating to the UE to continue to use the current QoS rule, according to some embodiments. In some embodiments, the message is transmitted with downlink service data adaptation protocol (SDAP) control PDU signaling and the timer may be provided by a fifth-generation core network (5GCN) per PDU session as part of a reflective QoS attribute (RQA).

In some embodiments, the base station may receive, from the UE, periodic report signaling to the base station to indicate the status of a reflective quality of service (RQ) timer. Furthermore, the base station may be capable of configuring the periodicity of the report signaling and the report signaling may comprise at least one of a QoS rule identifier, a 1-bit indication of whether the RQ timer is running or expired, and an indication of remaining time for the RQ timer to expire, according to some embodiments.

Additionally or alternatively, the base station may be configured to initiate and maintain a timer corresponding to a QoS rule for a PDU session at the UE and transmit, upon expiry of the timer, signaling including an indication to the UE to delete the QoS rule, according to some embodiments. In some embodiments, the message may be transmitted with downlink SDAP control PDU signaling or radio resource control (RRC) reconfiguration signaling.

According to further embodiments, the base station may transmit, to the UE, signaling including a quality of service flow identifier (QFI) value of 0 to indicate that a payload of the one or more data packets is a service data adaptation protocol (SDAP) control protocol data unit (PDU). Additionally or alternatively, the base station may configure the UE to transmit, to the base station, a confirmation or acknowledgement of at least one of an establishment of a new QoS rule and expiry of a RQ timer.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
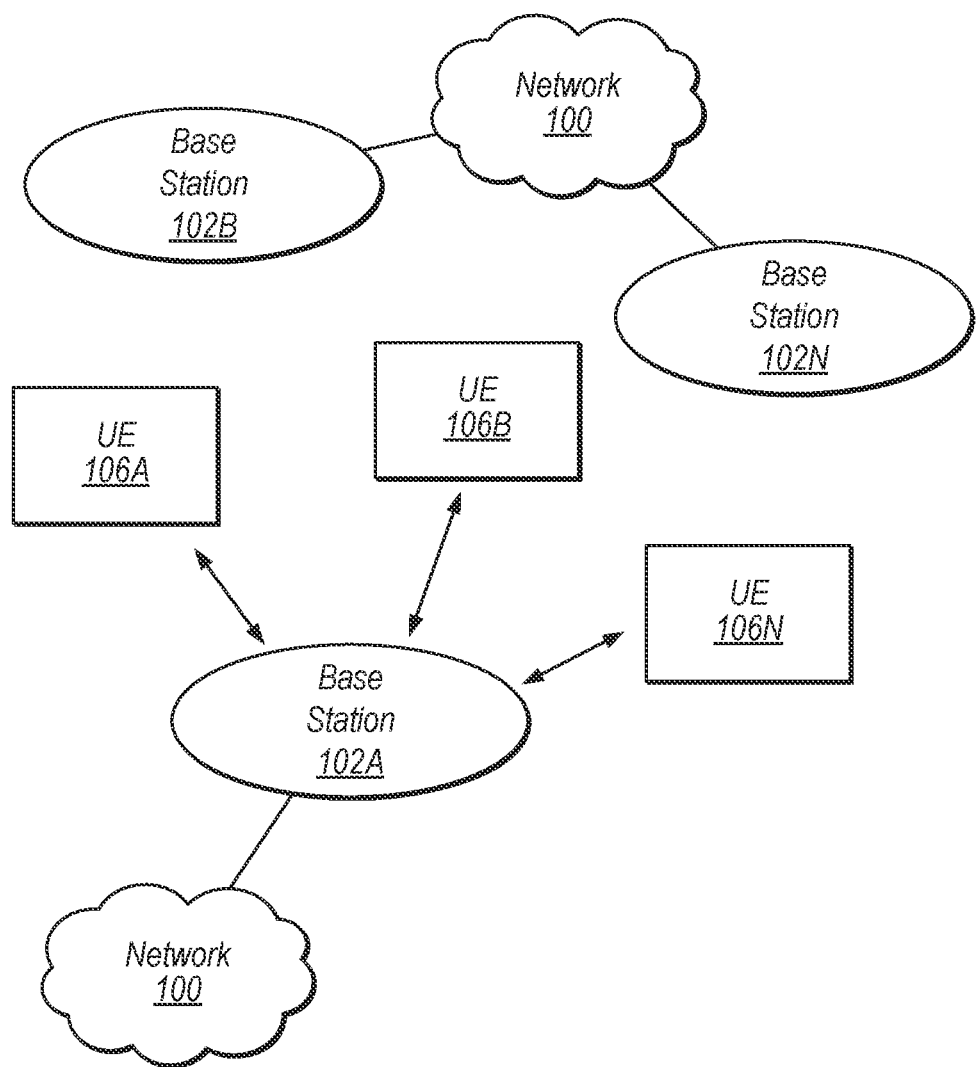
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
NG-RAN: RAN (either E-UTRAN or NR) Connected to the 5G Core Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
RRC: Radio Resource Control
MAC-CE: Media Access Control-Control Element
DCI: Downlink Control Information
PDCP: Protocol Data Convergence Protocol
SDU: Service Data Unit
PDU: Protocol Data Unit
SDAP: Service Data Adaptation Protocol
SDF: Service Data Flow
UPF: User Plane Function
QoS: Quality of Service
QFI: Quality of Service Flow Identifier
RQI: Reflective Quality of Service Indicator
RIM: Reflective QoS Flow to DRB Mapping Indication
RQA: Reflective QoS Attribute
TX: Transmission/Transmit
RX: Reception/Receive
DRB: Data Radio Bearer
AS: Access Stratum
NAS: Non-Access Stratum Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), head-mounted displays, VR displays, XR devices, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
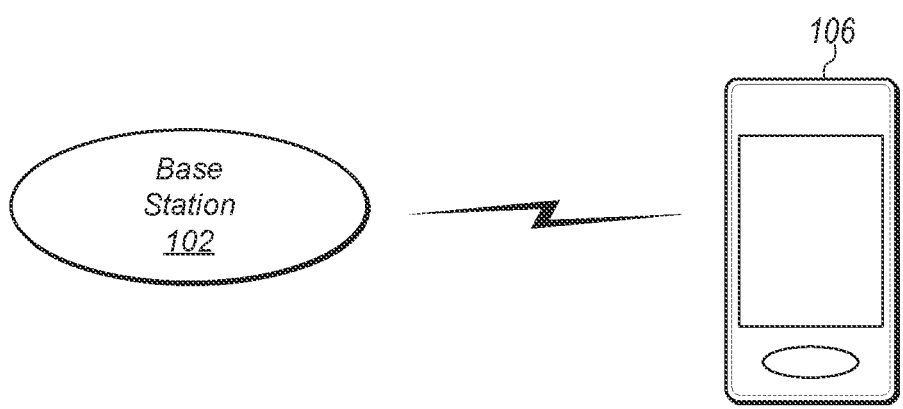
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (e.g., a processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
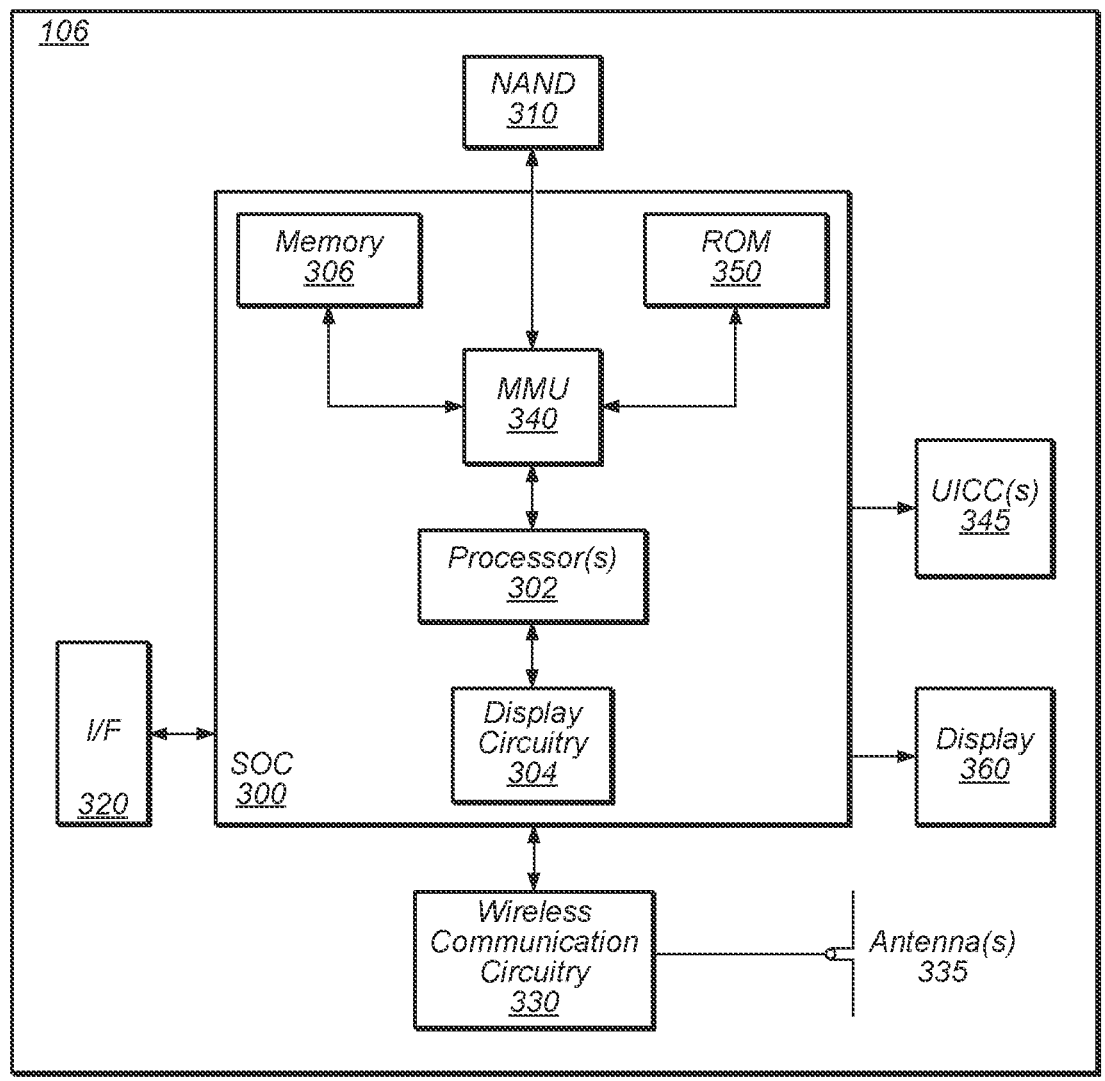
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
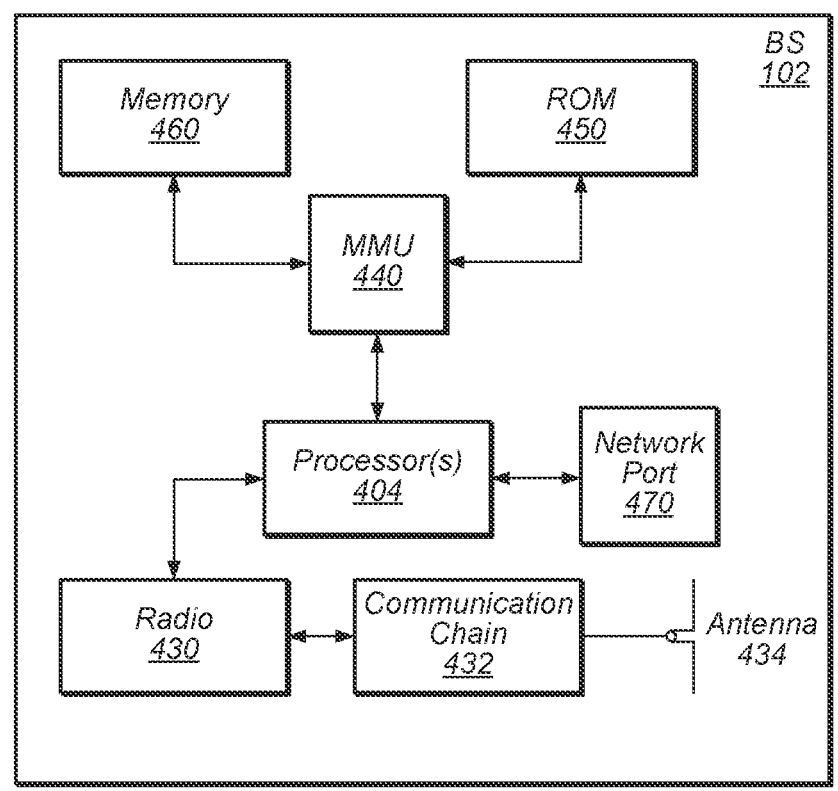
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
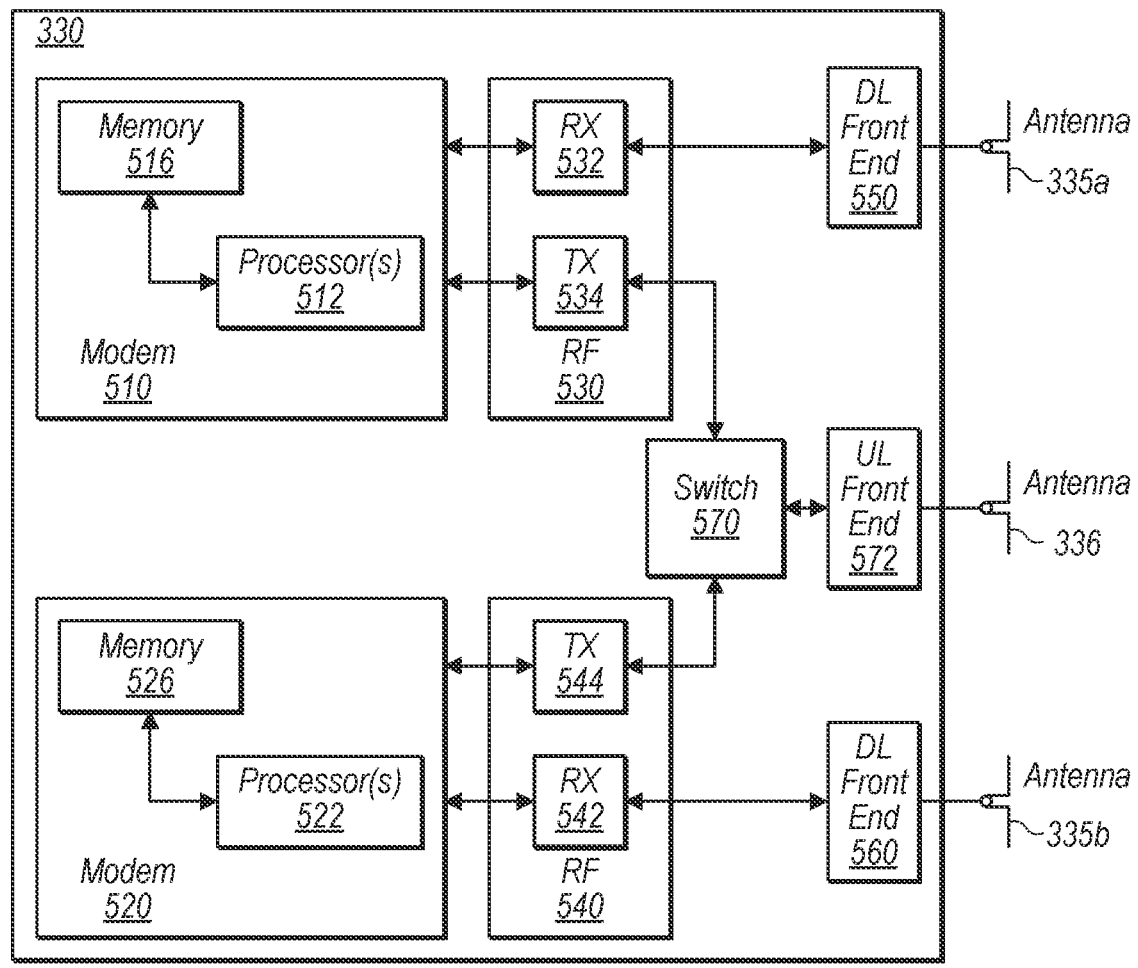
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a*-*b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5GNR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Communication Coordination and Reduced Processing Techniques for Enhanced Quality of Service Procedures According to some of the embodiments described herein, some mobile device services may exhibit deterministic behavior due to defined quality of service (QoS) parameters. For example, certain services may need to transmit and/or receive multiple streams of data types which correspond to different QoS requirements. In other words, certain data streams or service data flows (SDF) may be associated with certain QoS parameters which efficiently accommodate the transmission and reception of said data streams based on the associated QoS parameters. For example, a data stream or SDF including video frames may correspond to a certain QoS parameter set and a QoS rule (e.g., one or more packet filters) while another data stream or SDF including audio information may correspond to a different QoS parameter set and QoS rule (e.g., one or more packet filters). In some embodiments, the UE may be able to autonomously derive a QoS rule. Additionally, the payload of the data may often be transmitted and received periodically.

Moreover, data traffic (e.g., transmission/reception between the UE and the network) may involve multiple QoS flows mapped to the same or different data radio bearers (DRBs). For example, there may be a plurality of QoS flows associated with a single DRB (although other relationships are also envisioned). Furthermore, each QoS flow may have its own QoS forwarding treatment. Accordingly, if a different QoS forwarding treatment is needed for each of the QoS flows over the air interface, the network may map them to different DRBs. However, this may not always be possible given the larger amount of traffic flows in some data transmissions. In other words, the network may be incentivized to map different QoS flows to different DRBs.

In order to facilitate a mapping of certain data to network resources, some networks may assign certain QoS flows for information transmitted in data bursts in order to establish a higher priority and/or protection of the transmitted data such that data loss and latency is minimized. For example, QoS Flow IDs (QFIs) may be used to identify QoS flows in the network. In some embodiments, the QoS flows may require a guaranteed flow bit rate (GBR) or may not require a GBR (non-GBR). Additionally or alternatively, some QoS flows may be utilized for mission critical GBRs (e.g., Delay Critical QoS flows). These GBRs associated with the QoS flows may allow for higher efficiency data transfers for higher priority transmissions which may further result in an enhanced user experience.

In previous wireless communications standards, the mapping of QoS parameters were characterized by a one-to-one relation between the evolved packet core (EPC) and data radio bearers (DRBs). More specifically, the DRB, the evolved packet system (EPS) bearer, the S1 General Packet Radio System Tunnelling Protocol User Plane (GTP-U) and S5-U interface tunnel were characterized by a one-to-one QoS mapping. In other words, the UE was explicitly indicated or configured to utilize certain long-term service data flows (SDFs) and corresponding QoS rules based on the one-to-one mappings with the DRBs.

However, in the 5GC, the singular user plane function (UPF) may be utilized for the transport of data between an NG-RAN and other devices or nodes (e.g., UEs). Accordingly, DRBs on the air interface may have a one-to-many correspondence to the GTP-U tunnel on the UPF N3 interface. In other words, multiple QoS flows may be mapped to a single GTP-U tunnel. Accordingly, the NG-RAN may be capable of mapping individual QoS flows to one or more DRBs. Additionally, or alternatively, a PDU session may include multiple DRBs and QoS flows corresponding to a single N3 GTP-U tunnel. Accordingly, one of the DRBs may be capable of transporting one or more (e.g., a plurality of) QoS flows. In some scenarios, the UE may be able to adaptively derive the QoS rules on a packet-by-packet basis without receiving one or more explicit indications of the QoS rules from the session management function (SMF, e.g., the network).

Furthermore, the 5GC may be capable of enabling QoS at the QoS flow level such that each QoS flow packet may be classified and marked using a QoS flow identifier (QFI). The QFI may identify the flow may be carried in an extension header on the N3 interface in the GTP-U protocol. Accordingly, multiple QoS flows may be mapped in the access network (AN) to DRBs in the 5GC. The apparatuses, systems, and methods for communication coordination and reduced processing techniques for enhanced quality of service procedures may increase efficiency of the UE operations by further reducing unnecessary transmissions/receptions or processing of QoS related rules by shifting the maintenance of QoS states and rules to the network side. Accordingly, the UE may experience reduced processing requirements due to these mappings.

Enhancements to Reflective QoS and SDAP

In some embodiments, a UE may support reflective QoS at the NAS layer. Reflective QoS may be characterized such that for each DRB, the UE may monitor the QoS flow IDs of downlink packets and apply the same mapping to subsequent uplink transmissions. In other words, the UE may map its uplink packets belonging to the QoS flows and further corresponding to the QoS flow IDs and PDU session observed in the downlink packets for the associated DRB. Additionally or alternatively, the UE may indicate support of Reflective QoS functionality for every PDU session through (NAS) PDU session establishment/modification messages.

In some embodiments, the fifth-generation core network (5GC) may decide to use Reflective QoS for a particular QoS flow. For example, the 5GC may inform the random access network (RAN) by providing a Reflective QoS Attribute (RQA). Additionally or alternatively, the 5GC may apply a Reflective QoS Indication (RQI) marking to each packet sent from the user plane function (UPF) to the RAN. Furthermore, the 5GC (via the RAN), may provide the UE with a Reflective QoS Timer (RQ timer) per PDU session, according to some embodiments. Moreover, when the UE receives RQI on a DL packet, the UE may create a new UE derived QoS rule by "reflecting" the internet protocol (IP) 5-tuple, if one does not exist already. Additionally or alternatively, this may be followed by starting or restarting the RQ timer. When the RQ timer expires, the UE may delete the corresponding QoS rule, according to some embodiments. This Reflective QoS mechanism may be consider stateless by design due to the packets containing the RQI markings such that intermediate nodes (e.g., I-UPF, gNB) may not need to maintain the state of the RQI markings.

In some embodiments, a UE may support reflective mapping at the AS layer. In other words, the AS layer may support its own reflective mechanism. For example, at the AS layer, the UE may utilize a Reflective QoS mechanism to map QoS flows to DRBs. More specifically, DL packets may carry the Reflective QoS flow to DRB mapping Indication (RDI) in the SDAP header. For example, when the UE receives RDI on a DL packet, the UE may map the corresponding QoS flow in the UL direction to the corresponding UL DRB. In some embodiments, there may be no timers (e.g., RQ timers) involved in this process.

The stateless nature of the reflective mechanism may be characterized such that essentially every packet sent from the UPF to the UE is tagged with the QFI. Moreover, the SDAP layer may further notify the NAS layer each time it receives a packet with the RQI bit set. Accordingly, this may result in the NAS layer having to process QoS rules even if the rule already exists and may further result in a significant processing load. Additionally or alternatively, the UE may also have to keep track of or maintain the RQ timer in order to flush or discard QoS rules upon expiry of the timer.

Accordingly, it may be beneficial for the next generation random access network (NG-RAN, e.g., gNB or base station) rather than the UE to keep track of reflective QoS requirements due to the NG-RAN's enhanced power and processing capabilities.

According to some embodiments, reflective QoS mappings may be torn down (e.g., disabled) by either explicit RRC reconfiguration or new reflective mappings. Accordingly, the Reflective QoS mechanism at the AS layer may be considered stateful by design. For example, the UE may update the QoS flow to DRB mapping when the RDI bit is set to 1. Additionally or alternatively, when the RDI bit is set to 0, the UE may not need to perform any processing. Accordingly the UE may experience some secondary effects such as battery conservation by not having utilize various computing resources and/or power to perform said processing.

According to some embodiments, when QoS flows are re-mapped to a different bearer, it may be important for transmission quality purposes to ensure that the packets are delivered in the correct order. In some embodiments, this may be ensured by using an end-marker SDAP control PDU. For example, the UE may send an end marker at a time when a QoS flow is re-mapped (either via RRC messaging or reflectively). Accordingly, if a default DRB exists, then the end-marker may be sent even if packet belonging to the QoS flow has not been sent. In some embodiments, the network may buffer packets arriving on the new DRB until the end-marker is received on the old DRB.

Figure 6:
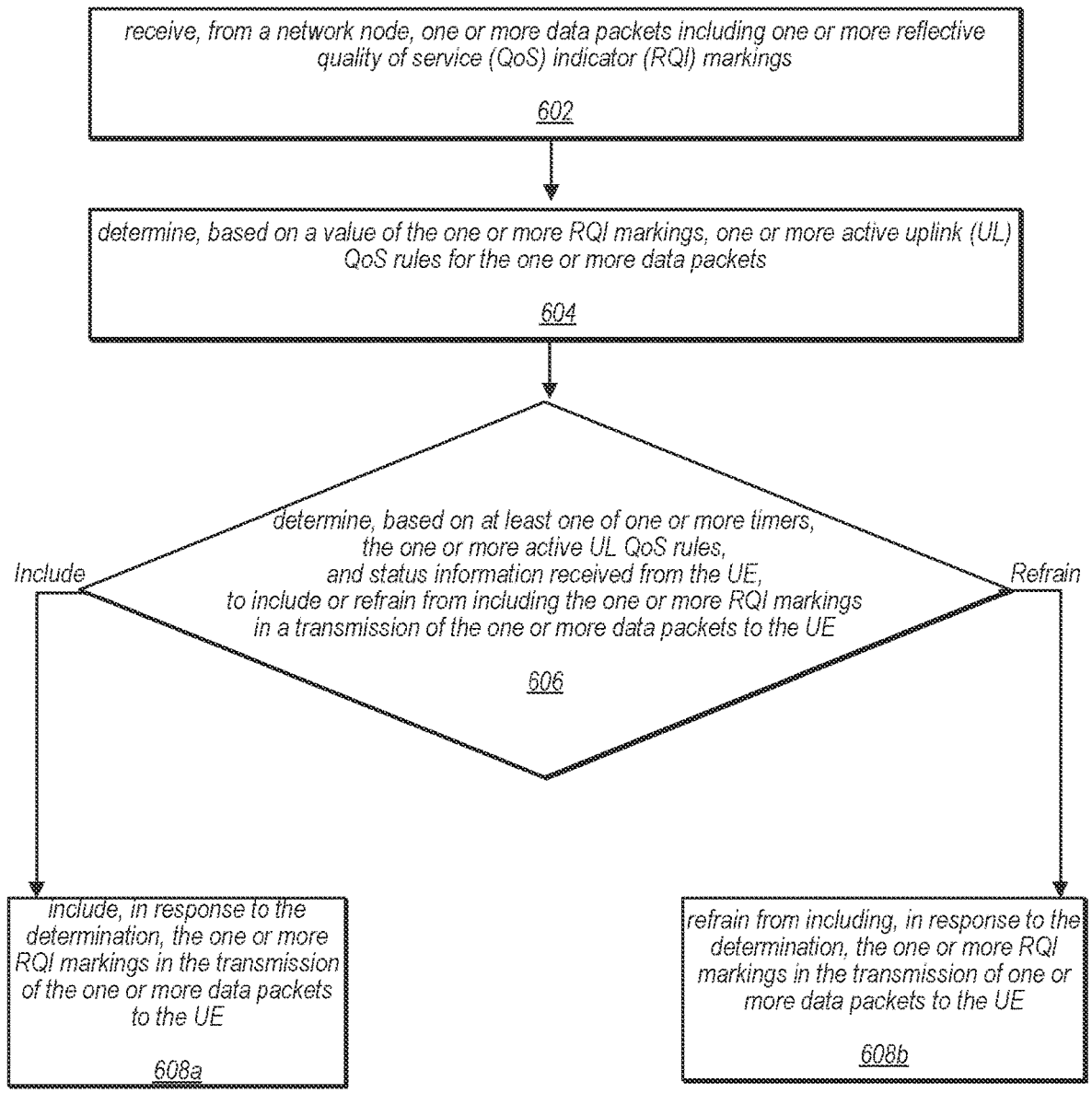
FIG. 6 is a flow diagram illustrating example aspects of a method for a base station maintaining QoS states for a UE, according to some embodiments.

FIG. 6—Base Station Maintaining of QoS states for a UE

FIG. 6 illustrates a flow diagram illustrating example aspects of a method for communication coordination and reduced processing techniques for enhanced quality of service procedures, according to some embodiments. More specifically, FIG. 6 illustrates a method in which the NG-RAN may keep track of each RQI marking for packets received from the UPF over NG-U (i.e., N3) interface and determining whether or not to forward the RQI markings to the UE based on one or more timers, one or more active UL QoS rules, and/or status information received from the UE.

Aspects of the method of FIG. 6 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 602, the NG-RAN may receive, from a network node (e.g., the user plane function (UPF)), one or more data packets including one or more reflective quality of service (QoS) indicator (RQI) markings. Furthermore, the NG-RAN (e.g., gNB) may keep track of each RQI marking for packets received from the user plane function (UPF) over a next generation user plane interface (NG-U) such as an N3 interface. In some embodiments, if the RQI marking or bit is not set (e.g., includes or equals a set value of 0), the NG-RAN may forward the RQI marking to the UE in the DL SDAP header. For example, the NG-RAN may translate the RQI field received over the N3 interface to the RQI field in the SDAP header if the header is configured, according to some embodiments.

In 604, if the RQI marking is set (e.g., includes or equals a bit value such as 1), the NG-RAN may determine if there is an active uplink QoS rule for the corresponding QFI and SDF associated with the incoming packet. In other words, the NG-RAN may determine that there is an UL QoS rule associated with the incoming packet. This determination may require processing the 5-tuple associated with the received packet for IP flows. Moreover, if the NG-RAN determines that there is not an active UL QoS rule associated with the incoming packet, the NG-RAN may forward the packet with the RQI marking to the UE. Furthermore, according to some embodiments, the NG-RAN may also create an RQI mapping for the UL QoS rule corresponding to the QoS flow.

In 606, the NG-RAN may determine, based on at least one of one or more timers, the one or more active UL QoS rules, and status information received from the UE, a decision to include the RQI markings in a transmission of the one or more data packets to the UE or refrain from including the RQI markings in a transmission of the one or more data packets to the UE. For example, the NG-RAN may determine that the UL QoS rule currently being used by the UE is the same as the one in the received RQI marking from the UPF. Accordingly, the NG-RAN may optionally choose not to send the RQI marking in the one or more packets transmitted to the UE since the UE is already utilizing the appropriate QoS rule. Additionally or alternatively, the NG-RAN may choose not to include the RQI marking in the subsequent transmission to the UE based on one or more RQ timers being maintained by the NG-RAN or the UE. As these RQ timers may indicate a point in time at which the UE may discard the corresponding QoS rule, the NG-RAN may also optionally allow the QoS rule to expire by not including the RQI marking. In some embodiments, the NG-RAN may not be maintaining an RQ timer and instead may receive periodic status report signaling from the UE which may include status information regarding the UE's RQ timer (e.g., amount of time remaining before expiry of the timer and discarding of the current QoS rule). Accordingly, the NG-RAN may be able to reduce the UE's processing burden by not sending redundant or non-useful RQI markings for which the UE would have to process the IP 5-tuple.

In 608a, according to some embodiments, the NG-RAN may, based on the factors or parameters used in the determinations of 604 and 606, provide the RQI marking to the UE. In some embodiments, the NG-RAN may provide the RQI marking to the UE by "piggybacking" the RQI marking on DL packets. For example, the NG-RAN may utilize the DL SDAP header in order to include the RQI marking with the data packets being sent to the UE. the Accordingly, in order to do so, DL packets should be available when the NG-RAN attempts to send the RQI marking.

In 608b, according to some embodiments, the NG-RAN may, based on the factors or parameters used in the determinations of 604 and 606, elect to not provide the RQI marking to the UE. For example, if the RQI marking is not provided to the UE, then the UE's RQ timer may expire and the UE may delete the QoS rule. This may be beneficial if the NG-RAN has determined that the UE's current QoS rule should be discarded or deleted such that a new QoS rule can be implemented, according to some embodiments. Moreover, the NG-RAN may also be capable of ensuring that the RQI marking is not sent for expired QoS rules at the UE (e.g., QoS rules that may have been discarded after expiry of the RQ timer).

Additional Information

In some embodiments, the UE and the NG-RAN (e.g., a base station such as a gNB) may both keep track of the RQ timer for each PDU session at the UE. For example, the 5GC may provide the RQ timer (per PDU session) as part of the Reflective QoS Attribute (RQA). Furthermore, when the NG-RAN detects that the UE may delete the QoS rule, it may send the RQI mark to the UE to keep the QoS rule "alive" or active. Additionally or alternatively, the NG-RAN may transmit or send the RQI marking multiple times (corresponding to multiple packets) for reliability purposes. In some embodiments, these "keep-alive" messages may be sent with DL packets if such packets are available. Additionally or alternatively, the "keep-alive" messages may be transmitted with a new DL SDAP control PDU. Accordingly, it may be necessary for the NG-RAN to run a RQ timer of its own. Accordingly, the UE's RQ timer may not be aligned with the NG-RAN's RQ timer which may further result in a QoS rule having a longer life than desired.

In some embodiments, the UE may indicate the status of the RQ timer periodically to the NG-RAN. For example, the status indicator or indication may be in the form of the QoS rule identifier plus a 1-bit indication of whether the RQ timer is currently running or expired. Additionally or alternatively, the status indicator or indication may contain additional information such as the remaining time for the RQ timer to expire. Furthermore, the periodicity at which the UE may periodically indicate said status of the RQ timer may be configured by the NG-RAN, according to some embodiments. In some embodiments, status reports may be sent using a new UL SDAP control PDU. For example, the NG-RAN may delete or discard an active QoS rule for which the UE has indicated that the RQ timer has expired. The NG-RAN may then use the status report to decide whether or not to send the RQI marking received in subsequent DL packets. Accordingly, it may be necessary for the UE to send periodic reports to the NG-RAN. Furthermore, the NG-RAN's state (of a QoS rule) may not be perfectly aligned with the UE.

In some embodiments, the NG-RAN (e.g., a base station, gNB), rather than the UE, may maintain the RQ timer. For example, when the NG-RAN's RQ timer expires, the NG-RAN may send an indication to the UE indicating that the RQ timer has expired which may further indicate to the UE that it should discard its QoS rule associated with that RQ timer and PDU session. In some embodiments, the NG-RAN may send said indication to the UE using a DL SDAP control PDU. Additionally or alternatively, the NG-RAN may utilize RRC reconfiguration signaling to indicate to the UE that the RQ timer has expired and that it should discard or delete its QoS rule. One benefit of the NG-RAN, rather than the UE, maintaining the RQ timer may be that there would likely be no discernable mismatch in the UE and NG-RAN QoS states. Furthermore, due to the fact that the UE may not have to maintain RQ timers since the NG-RAN is performing this task, the UE may, as a result, benefit from the reduced processing and power consumption. Moreover, the NG-RAN may only need to send the RQI once during the duration of a QoS rule which may further minimize UE processing requirements, according to some embodiments. Additionally or alternatively and according to some embodiments, the NG-RAN may send the RQI multiple times for greater reliability. In some embodiments, the NG-RAN may use DL packets or DL SDAP control PDU to send the RQI. According to some embodiments, an uplink SDAP control confirming the establishment of the QoS rule and/or expiry of the RQ timer may be needed for greater reliability. Accordingly, the NG-RAN may configure the UE such that the UE is required to transmit said confirmation response.

In the scenario in which a spare bit is not available in the DL SDAP header to differentiate between data and control PDUs, the NG-RAN may utilize the QFI value of 0 to indicate that the payload is a SDAP control PDU, according to some embodiments. For example, the "keep-alive" SDAP control PDU may indicate QFI and packet fields corresponding to the QoS rule. Additionally or alternatively, the RQ timer expiry SDAP control PDU may also be used by the NG-RAN to indicate to the UE the QFI and packet fields corresponding to the QoS rule, according to some embodiments. Moreover, in some embodiments, the use of a QFI value of 0 may not be limited to these DL SDAP control PDUs. More specifically, the QFI value of 0 may be used as or for providing a general mechanism for transfer of control information. For example, the QFI value of 0 could be used as a DL SDAP control PDU to manage handovers, according to some embodiments.

In some embodiments, there may be an available spare bit in the UL SDAP header which may be used to characterize a new UL SDAP PDU or extension header. Additionally or alternatively, an RQ timer status report SDAP control PDU may be used by the UE to indicate to the NG-RAN the status of the RQ timer periodically, according to some embodiments. For example, the status may be indicated as a QoS rule identifier plus a 1-bit indication which may indicate whether the RQ timer is running or expired.

In some embodiments, the UE may provide an acknowledgment of its RQI reception from the NG-RAN (e.g., a base station). For example, the UE may confirm that it has created a QoS rule with the parameters (QFI plus packet filter information). Additionally or alternatively, the UE may provide an acknowledgment of its RQI timer expiry, according to some embodiments. For example, the UE may provide a confirmation message to the NG-RAN that it has deleted the corresponding QoS rule.

Example Embodiments

Still another example embodiment may include a device, comprising: an antenna; a radio coupled to the antenna; and a processing element operably coupled to the radio, wherein the device is configured to implement any or all parts of the preceding examples.

Yet another example embodiment may include a method, comprising: by a device: performing any or all parts of the preceding examples.

A further embodiment may include a non-transitory computer accessible memory medium comprising program instructions which, when executed at a device, cause the device to implement any or all parts of any of the preceding examples.

A still further example embodiment may include a computer program comprising instructions for performing any or all parts of any of the preceding examples.

A yet further example embodiment may include an apparatus comprising means for performing any or all of the elements of any of the preceding examples.

Still another example embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to, when executing instructions stored in a memory, cause a base station (BS) to perform operations comprising:
receiving, from a network node, one or more data packets, wherein the one or more data packets comprise one or more reflective quality of service (QOS) indicator (RQI) markings;
receiving, from a user equipment (UE), status information associated with at least one of one or more active uplink (UL) QoS rules or at least one timer maintained by the UE;
identifying, based on at least one of the status information or a value of the one or more RQI markings, the one or more active UL QoS rules associated with the UE;
initiating and maintaining one or more timers corresponding to a QoS rule for a protocol data unit (PDU) session with the UE;
determining, based on at least one of the one or more timers maintained by the BS, the one or more active UL QoS rules, or the status information received from the UE, to include the one or more RQI markings in a transmission of the one or more data packets to the UE;
transmitting the one or more data packets to the UE, wherein the one or more data packets comprise the one or more RQI markings; and
transmitting, upon expiry of the one or more timers, signaling comprising an indication to the UE to delete the QoS rule.

2. The apparatus of claim 1, wherein the operations further comprise:
determining, based on the one or more timers maintained by the base station, that the UE will discard a current QoS rule based on an additional timer initiated and maintained by the UE; and
transmitting, in response to the determination that the UE will discard the current QoS rule, a message indicating to the UE to continue to use the current QoS rule.

3. The apparatus of claim 2, wherein the message is transmitted with downlink service data adaptation protocol (SDAP) control PDU signaling.

4. The apparatus of claim 2, wherein the one or more timers are provided by a fifth-generation core network (5GCN) per PDU session as part of a reflective QoS attribute (RQA).

5. The apparatus of claim 1, wherein the operations further comprise:
receiving, from the UE, periodic report signaling to indicate a status of a reflective quality of service (RQ) timer.

6. The apparatus of claim 5, wherein the operations further comprise:
configuring a periodicity of the periodic report signaling.

7. The apparatus of claim 5, wherein the periodic report signaling comprises at least one of a QoS rule identifier, a 1-bit indication of whether the RQ timer is running or expired, and an indication of remaining time for the RQ timer to expire.

8. The apparatus of claim 1, wherein the operations further comprise:
configuring the UE to transmit, to the BS, a confirmation or acknowledgement of at least one of an establishment of a new QoS rule and expiry of a RQ timer.

9. A method, comprising:
by a base station (BS):
receiving, from a network node, one or more data packets, wherein the one or more data packets comprise one or more reflective quality of service (QOS) indicator (RQI) markings;
receiving, from a user equipment (UE), status information associated with at least one of one or more active uplink (UL) QOS rules or at least one timer maintained by the UE;
identifying, based on one of the status information or a value of the one or more RQI markings, the one or more active UL QoS rules associated with the UE;
initiating and maintaining one or more timers corresponding to a QoS rule for a protocol data unit (PDU) session with the UE;
determining, based on at least one of the one or more timers maintained by the BS, the one or more active UL QOS rules, or the status information received from the UE, to refrain from including the one or more RQI markings in a transmission of the one or more data packets to the UE;
transmitting the one or more data packets to the UE, wherein the one or more data packets do not comprise the one or more RQI markings; and
transmitting, upon expiry of the one or more timers, signaling comprising an indication to the UE to delete the QoS rule.

10. The method of claim 9, wherein determination of the one or more active UL QOS rules is further based on processing a 5-tuple associated with the one or more data packets.

11. An apparatus, comprising a processor configured to, when executing instructions in a memory, cause a user equipment (UE) to perform operations comprising:
receiving, from a base station (BS), configuration information for periodic status report signaling, wherein the configuration information is useable by the UE in configuring a periodicity of the periodic status report signaling;
transmitting, to the BS, periodic status report signaling, wherein the periodic status report signaling comprises status information associated with at least one of one or more active uplink (UL) quality of service (QOS) rules or at least one reflective quality of service (RQ) timer maintained by the UE;

receiving one or more data packets comprising one or more reflective QoS indicator (RQI) markings, wherein the one or more data packets comprising the one or more RQI markings is indicative of a determination of the BS to include the RQI markings in the one or more data packets based on the one or more active UL QOS rules, the status information, and at least one RQ timer initiated and maintained by the BS corresponding to a QoS rule for a protocol data unit (PDU) session with the UE; and receiving, upon expiry of the at least one RQ timer, signaling comprising an indication to the UE to delete the QoS rule.

12. The apparatus of claim 11, wherein the operations further comprise:

receiving, from the BS, a message indicating to the UE to continue to use a current active QoS rule.

13. The apparatus of claim 12, wherein the operations further comprise:

receiving, from the BS, signaling comprising a quality of service flow identifier (QFI) value of 0 to indicate that a payload of the one or more data packets is a service data adaptation protocol (SDAP) control protocol data unit (PDU).

14. The apparatus of claim 11, wherein the operations further comprise:

transmitting, to the BS, a confirmation or acknowledgement message of at least one of an establishment of a new QoS rule and expiry of a RQ timer.

15. The apparatus of claim 11, wherein the operations further comprise:

determining, based on the at least one RQ timer maintained by the UE, that a current QoS rule will be discarded by the UE; and receiving, from the BS, a message indicating to the UE to continue to use the current QoS rule.

16. The apparatus of claim 15, wherein the message is transmitted with downlink service data adaptation protocol (SDAP) control PDU signaling.

17. The apparatus of claim 15, wherein the at least one RQ timer is provided by a fifth-generation core network (5GCN) per PDU session as part of a reflective QOS attribute (RQA).

18. The apparatus of claim 11, wherein the periodic status report signaling comprises at least one of a QOS rule identifier, a 1-bit indication of whether the at least one RQ timer is running or expired, or an indication of remaining time for the at least one RQ timer to expire.

19. The apparatus of claim 11, further comprising:

a radio operably coupled to the processor.

20. The apparatus of claim 11, wherein the processor is a baseband processor.

* * * * *